United States Patent
Fernandez

(10) Patent No.: US 9,851,625 B1
(45) Date of Patent: Dec. 26, 2017

(54) MULTI-FUNCTIONAL ACCESSORY FOR PORTABLE ELECTRONIC DEVICE AND ASSOCIATED USE THEREOF

(71) Applicant: Raymond Ballesteros Fernandez, Corona, CA (US)

(72) Inventor: Raymond Ballesteros Fernandez, Corona, CA (US)

( * ) Notice: Subject to any disclaimer, the term of this patent is extended or adjusted under 35 U.S.C. 154(b) by 0 days.

(21) Appl. No.: 15/498,351

(22) Filed: Apr. 26, 2017

Related U.S. Application Data

(60) Provisional application No. 62/327,608, filed on Apr. 26, 2016.

(51) Int. Cl.
| | | |
|---|---|---|
| G03B 17/56 | (2006.01) |
| F16M 11/28 | (2006.01) |
| F16M 11/20 | (2006.01) |
| F16M 11/14 | (2006.01) |
| F16M 11/04 | (2006.01) |
| F16M 13/02 | (2006.01) |
| H02J 7/00 | (2006.01) |
| H04R 1/02 | (2006.01) |
| G03B 17/38 | (2006.01) |
| G03B 15/02 | (2006.01) |

(52) U.S. Cl.
CPC ......... G03B 17/561 (2013.01); F16M 11/041 (2013.01); F16M 11/14 (2013.01); F16M 11/2014 (2013.01); F16M 11/2021 (2013.01); F16M 11/28 (2013.01); F16M 13/022 (2013.01); G03B 15/02 (2013.01); G03B 17/38 (2013.01); H02J 7/0052 (2013.01); H04R 1/028 (2013.01); H02J 2007/0062 (2013.01); H04R 2420/07 (2013.01)

(58) Field of Classification Search
CPC ....................................................... G03B 17/56
USPC ........................................................... 396/425
See application file for complete search history.

(56) References Cited

U.S. PATENT DOCUMENTS

| | | | | |
|---|---|---|---|---|
| 2,763,456 A | * | 9/1956 | Breer ..................... | F16M 11/08 248/155 |
| 2,771,826 A | * | 11/1956 | Shapiro .................. | F16M 13/04 224/257 |
| 3,836,986 A | * | 9/1974 | Kawazoe ............... | F16M 11/16 248/163.1 |
| 5,421,549 A | * | 6/1995 | Richards ................ | F16M 11/10 248/163.2 |

(Continued)

*Primary Examiner* — Clayton E LaBalle
*Assistant Examiner* — Kevin Butler

(57) ABSTRACT

A multi-functional accessory includes an adjustable holder having an anterior side configured to receive and maintain the existing portable electronic device at a substantially stable position, a telescopic support pole detachably mated to the adjustable holder wherein the telescopic support pole has a centrally registered longitudinal y-axis, a base stand detachably coupled to the telescopic support pole and selectively oriented parallel to an x-axis registered orthogonal to the y-axis. Advantageously, the adjustable holder is selectively articulated about the x-axis and the y-axis. Notably, a user interface is configured to be in operable communication with the existing portable electronic device. Such a user interface includes an actuation button configured to execute at least one operational function selected from a group including taking a picture and recording a video at the existing portable electronic device.

19 Claims, 17 Drawing Sheets

(56) References Cited

U.S. PATENT DOCUMENTS

| | | | | |
|---|---|---|---|---|
| 6,007,259 A * | 12/1999 | Mori | | F16M 11/28 248/168 |
| 7,845,602 B1 * | 12/2010 | Young | | F16B 7/1409 248/125.8 |
| 8,322,665 B2 * | 12/2012 | Palik | | F16M 11/32 248/150 |
| 8,614,406 B2 * | 12/2013 | Hall, Jr. | | H05B 3/008 108/50.13 |
| 9,243,741 B1 * | 1/2016 | Chu | | H04N 5/23219 |
| 9,381,976 B1 * | 7/2016 | Corley | | B63B 17/00 |
| 2005/0045783 A1 * | 3/2005 | Brumley | | B23K 37/0452 248/181.1 |
| 2005/0098692 A1 * | 5/2005 | Yang | | F16M 11/10 248/163.1 |
| 2006/0273227 A1 * | 12/2006 | Smith | | F16M 13/04 248/123.11 |
| 2008/0011344 A1 * | 1/2008 | Barker | | F16M 11/14 135/66 |
| 2008/0226284 A1 * | 9/2008 | Coppola | | F16M 11/046 396/428 |
| 2008/0247746 A1 * | 10/2008 | Law | | F16M 11/041 396/419 |
| 2008/0267613 A1 * | 10/2008 | Darrow | | F16M 11/041 396/428 |
| 2008/0310834 A1 * | 12/2008 | Chatman, II | | F16M 11/22 396/419 |
| 2009/0039213 A1 * | 2/2009 | Darrow | | B60R 11/02 248/163.1 |
| 2009/0257741 A1 * | 10/2009 | Greb | | F16M 13/04 396/55 |
| 2010/0098405 A1 * | 4/2010 | Coppola | | F16M 11/045 396/428 |
| 2010/0155549 A1 * | 6/2010 | Robinson | | F16M 11/10 248/183.1 |
| 2010/0200710 A1 * | 8/2010 | Shenouda | | F16M 11/28 248/157 |
| 2010/0238345 A1 * | 9/2010 | Greb | | F16M 11/125 348/373 |
| 2011/0024596 A1 * | 2/2011 | Kephart | | F16M 11/045 248/440.1 |
| 2012/0160980 A1 * | 6/2012 | Wang | | F16M 11/10 248/405 |
| 2013/0176412 A1 * | 7/2013 | Chen | | H04N 7/183 348/77 |
| 2013/0233986 A1 * | 9/2013 | Rasheta | | G03B 17/561 248/205.1 |
| 2013/0233988 A1 * | 9/2013 | Johnson | | G03B 17/561 248/229.14 |
| 2013/0236235 A1 * | 9/2013 | Johnson, Sr. | | F16C 11/04 403/53 |
| 2013/0287386 A1 * | 10/2013 | Xu | | F16M 11/041 396/428 |
| 2014/0191094 A1 * | 7/2014 | Esarey | | F16M 11/14 248/170 |
| 2014/0209777 A1 * | 7/2014 | Klemin | | F16M 13/04 248/544 |
| 2015/0003820 A1 * | 1/2015 | Li | | G03B 17/561 396/428 |
| 2015/0048233 A1 * | 2/2015 | Dumas | | F16M 11/32 248/550 |
| 2015/0351531 A1 * | 12/2015 | Dalton | | F16M 13/022 248/558 |
| 2016/0091139 A1 * | 3/2016 | Levine | | F16M 13/04 294/139 |
| 2016/0192780 A1 * | 7/2016 | Sinclair | | A47C 4/04 297/183.5 |
| 2016/0277660 A1 * | 9/2016 | Kaiser | | G03B 17/38 |
| 2016/0306264 A1 * | 10/2016 | Chu | | G03B 17/563 |
| 2017/0003574 A1 * | 1/2017 | Choi | | G03B 15/07 |
| 2017/0146892 A1 * | 5/2017 | Wei | | F16M 11/045 |
| 2017/0241589 A1 * | 8/2017 | Wang | | F16M 13/04 |

\* cited by examiner

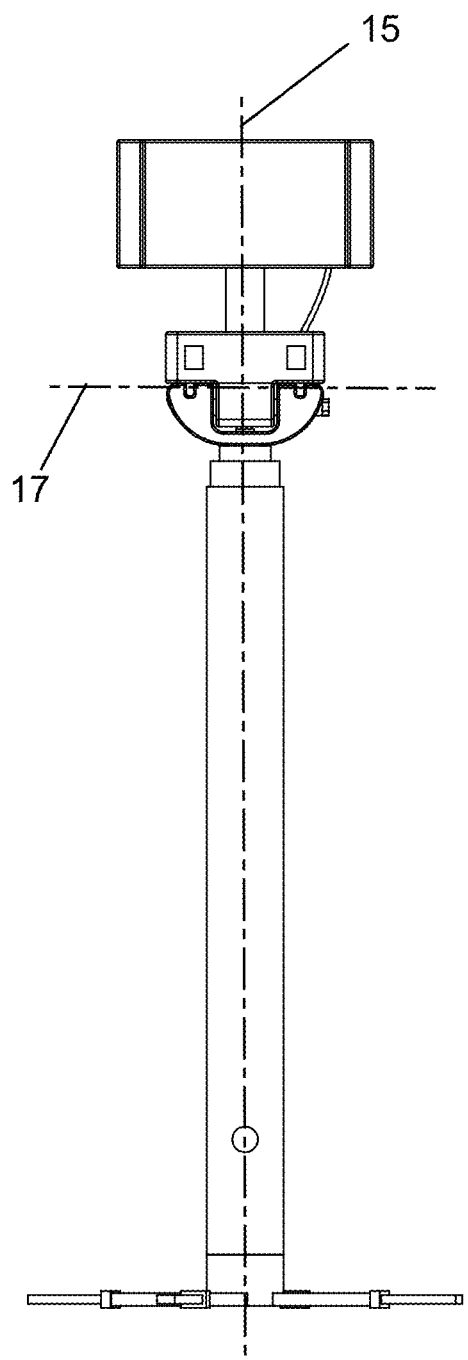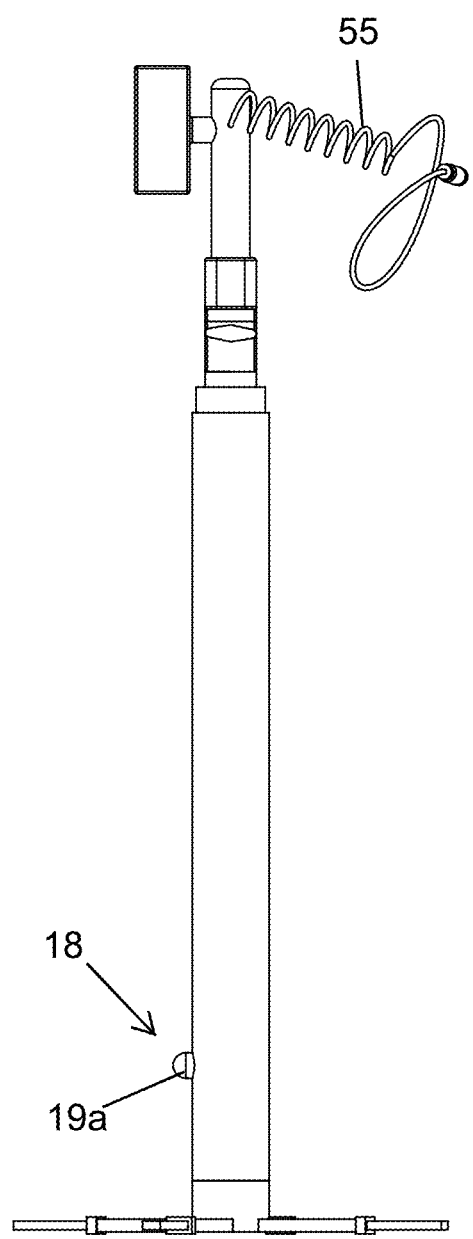
FIG. 7
FIG. 8

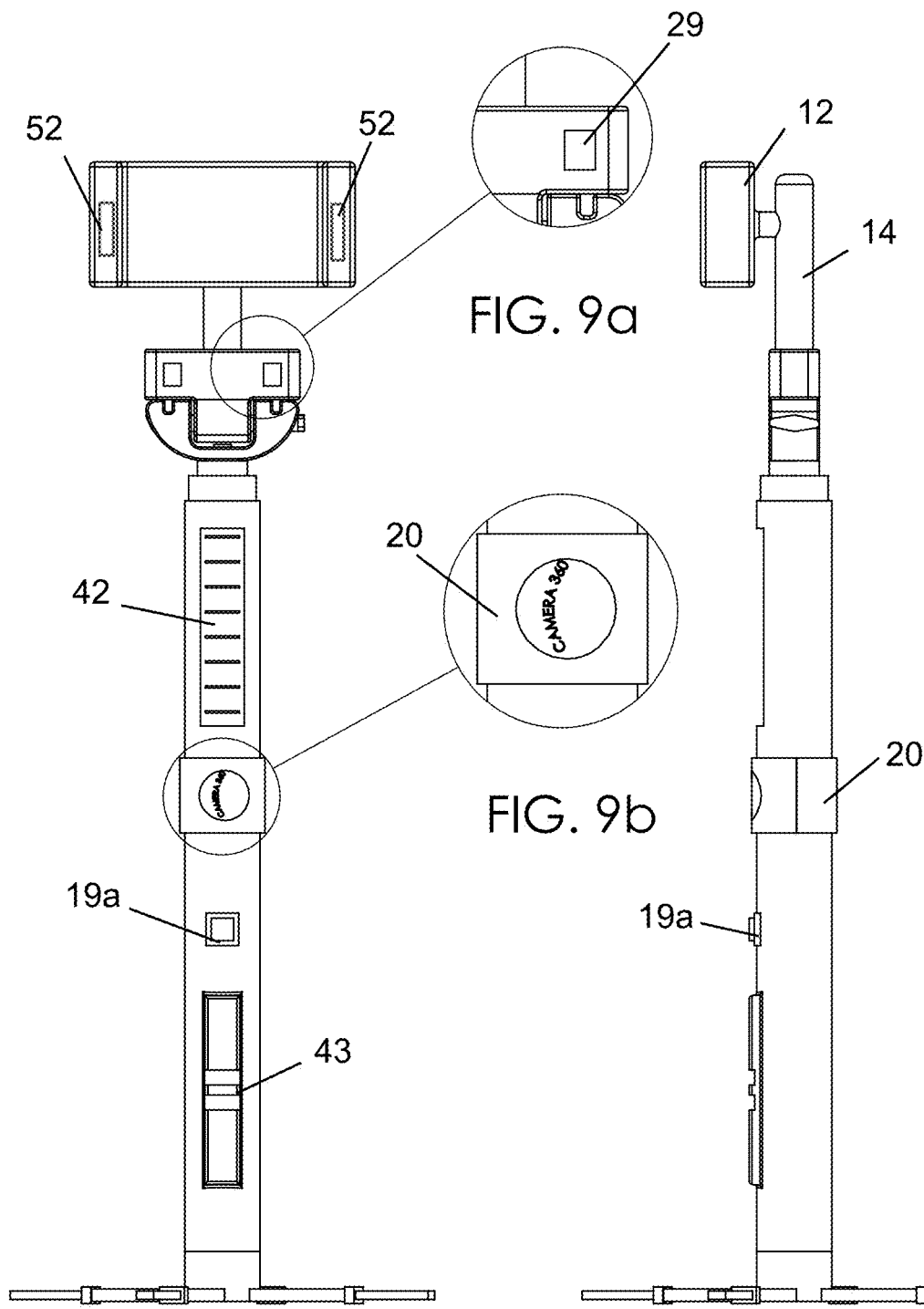

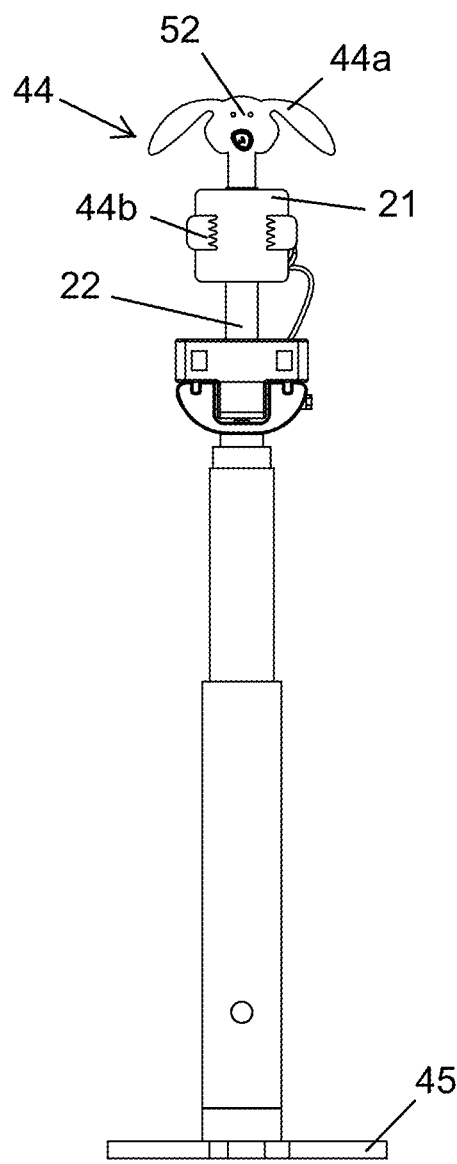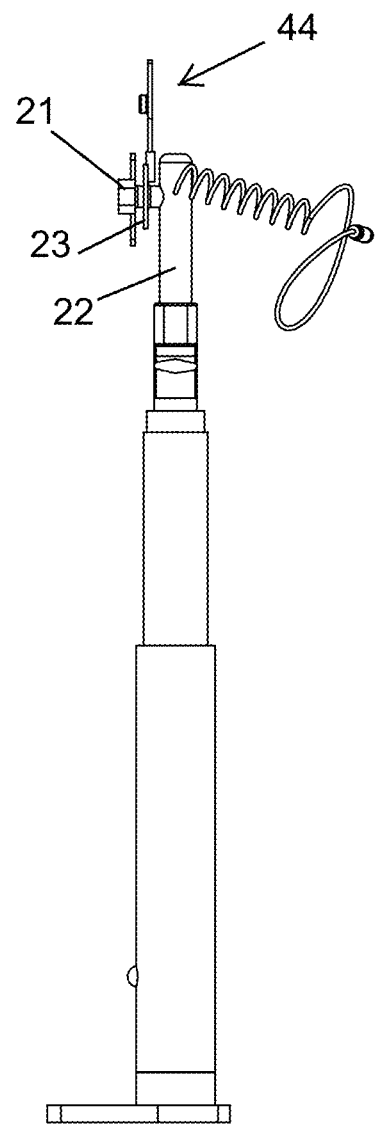
FIG. 21                     FIG. 22

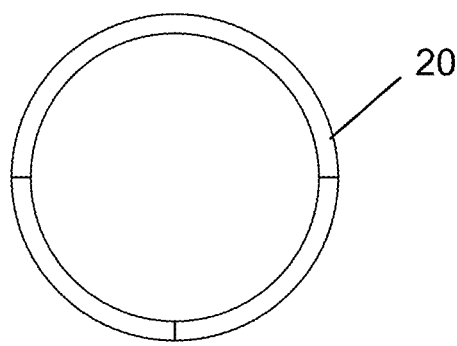
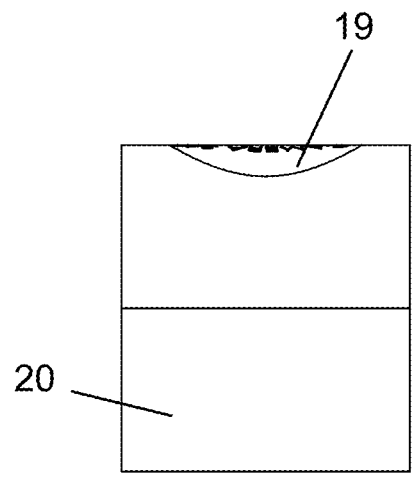
FIG. 30
FIG. 31
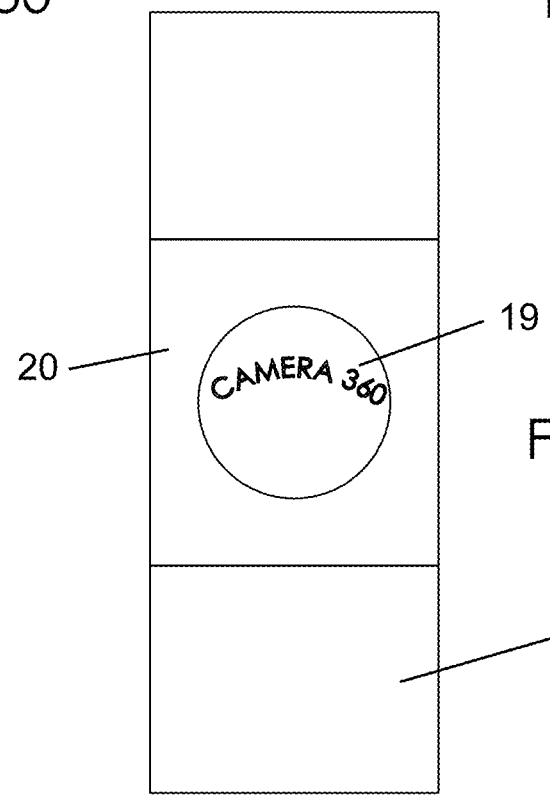
FIG. 32

MULTI-FUNCTIONAL ACCESSORY FOR PORTABLE ELECTRONIC DEVICE AND ASSOCIATED USE THEREOF

CROSS REFERENCE TO RELATED APPLICATIONS

This is a non-provisional patent application that claims the benefit of U.S. provisional patent application No. 62/327,608 filed Apr. 26, 2016, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to accessories for portable electronic devices and, more particularly, to a multi-functional, telescoping support monopod, for use when engaging in self-photography, featuring a fully rotatable smartphone/camera holder and a variety of detachable base stands, including a tri-pod, square base, and clamp base, for free standing selfies, shooting or viewing video, and more. Design intent is to provide an easier, more effective means of capturing selfie pics and video from all angles, including vertical. Options may include BLUETOOTH®/BLUETOOTH® remote control; speakers; flash assistance, lighting and charging capabilities; special character designs, etc.

Prior Art

One of the most popular genres of photography enjoyed by consumers from all walks of life and all age groups is the self-portrait, commonly referred to as a "selfie". A selfie portrait involves holding a camera (most commonly those installed in smartphones or similar electronic devices) away from the body and directing the camera at oneself. Most consumers agree that it is fun to take selfies and most skilled selfie photographers know that by holding their camera at the proper angle and smiling, they can capture a truly flattering image of themselves. Selfies are most often shared on social media, with Facebook, Instagram, Twitter, and Tumblr but a few of the websites where thousands of selfies are posted by people from around the world, every day. Selfies have especially gained popularity with celebrities, providing these individuals a simple means of promoting themselves, connecting with fans and presenting a relatable image to the masses. In fact, a selfie taken by Ellen DeGeneres and featuring such stars as Jennifer Lawrence, Bradley Cooper and Julia Roberts was shared via social media during the 2014 Academy Awards and became the most retweeted photo of all time, with over 2 million people sharing the image. Everyone from the President of the United States to Pope Francis has gotten in on the selfie craze, with this trend hardly showing any signs of abating.

Accordingly, a need remains for a multi-functional accessory for a portable electronic device in order to overcome at least one aforementioned shortcoming. The exemplary embodiment(s) satisfy such a need by providing a multi-functional, telescoping support monopods, for use when engaging in self-photography, featuring a fully rotatable smartphone/camera holder and a variety of detachable base stands, including a tri-pod, square base, and clamp base, for free standing selfies, shooting or viewing video, and more, which is convenient and easy to use, lightweight yet durable in design, versatile in its applications, and designed for providing an easier, more effective means of capturing selfie pics and video from all angles, including vertical. Options may include Bluetooth®/Bluetooth remote control; speakers; flash assistance, lighting and charging capabilities; special character designs, etc.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a multi-functional accessory for supporting an existing portable electronic device when engaging in self-photography and self-videography. These and other objects, features, and advantages of the non-limiting exemplary embodiment(s) are provided by the multi-functional accessory including an adjustable holder having an anterior side configured to receive and maintain the existing portable electronic device at a substantially stable position, a telescopic support pole detachably mated to the adjustable holder wherein the telescopic support pole has a centrally registered longitudinal y-axis, a base stand detachably coupled to the telescopic support pole and selectively oriented parallel to an x-axis registered orthogonal to the y-axis. Advantageously, the adjustable holder is selectively articulated about the x-axis and the y-axis. Notably, a user interface is configured to be in operable communication with the existing portable electronic device. Such a user interface includes an actuation button configured to execute at least one operational function selected from a group including taking a picture and recording a video at the existing portable electronic device.

In a non-limiting exemplary embodiment, the user interface includes a ring having the actuation button disposed thereon. Such a ring is slidably positioned about the telescopic support pole and removable therefrom.

In a non-limiting exemplary embodiment, the holder includes a stretchable and resilient U-shaped brace having a substantially rectangular shape at a non-stretched equilibrium position, and a prop situated at a posterior side of the U-shaped brace. Advantageously, the prop has a first portion registered parallel to the y-axis, and a second portion registered parallel to a z-axis and statically mated to a proximal end of the first portion. In this manner, posterior side of the U-shaped brace is rotatably coupled to the second portion and rotated about the z-axis. A bracket has an upper section statically coupled to a distal end of the second portion. Advantageously, the upper section has a first light-emitting source facing towards an anterior direction relative to the posterior side of the U-shaped brace. The bracket further has a lower section adjustably connected to the upper section. Advantageously, the upper section is selectively rotated about the x-axis relative to the lower section, wherein the lower section is statically coupled to a proximal tip of the telescopic support pole.

In a non-limiting exemplary embodiment, the base stand includes a central hub detachably mated to a distal tip of the telescopic support pole, and a plurality of telescopic spokes equidistantly spaced along a circumferential perimeter of the hub. Notably, the telescopic spokes are pivotally coupled to the hub and selectively articulated between an extended horizontal position parallel to the x-axis and a retracted vertical position parallel to the y-axis.

In a non-limiting exemplary embodiment, the base stand includes a spindle section mated to a distal tip of the telescopic support pole, and a flat support plate fixedly coupled to the spindle section. Notably, the spindle section rotates in sync with the telescopic support pole relative to a stationary position of the flat support plate.

In a non-limiting exemplary embodiment, the base stand includes a spring-actuated clip coupled to a distal tip of the telescopic support plate.

In a non-limiting exemplary embodiment, a power source is housed inside the telescopic support pole, a speaker is disposed at the telescopic support pole and is in communication with the power source and the existing portable electronic device such that audio signals transmitted from the existing portable electronic device are emanated from the speaker. A USB charging port is disposed at the telescopic support pole and is in communication with the power source.

In a non-limiting exemplary embodiment, a novelty item is connected to the prop and situated at the posterior side of the brace. Such a novelty item includes at least one of a character face and a plurality of adjustable hands in close proximity to the brace. In addition, the base stand may include character feet.

In a non-limiting exemplary embodiment, a second light emitting source is located at one of the character face, the brace and the telescopic support pole.

The present disclosure further includes a method of utilizing a multi-functional accessory for supporting an existing portable electronic device when engaging in self-photography and self-videography. Such a method includes the steps of: providing an adjustable holder having an anterior side configured to receive and maintain the existing portable electronic device at a substantially stable position; providing and detachably matting a telescopic support pole to the adjustable holder wherein the telescopic support pole has a centrally registered longitudinal y-axis; and providing and detachably coupling a base stand to the telescopic support pole wherein the base stand is selectively oriented parallel to an x-axis registered orthogonal to the y-axis.

Such a method further includes the steps of: providing a user interface configured to be in operable communication with the existing portable electronic device wherein the user interface includes an actuation button configured to execute at least one operational function selected from a group including taking a picture and recording a video at the existing portable electronic device; and selectively articulating the adjustable holder about the x-axis and the y-axis.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

FIG. 7 is a side elevational view of the multi-functional accessory shown in FIG. 1;

FIG. 8 is a side elevational view of the multi-functional accessory shown in FIG. 1;

FIG. 9 is a front elevational view of the multi-functional accessory shown in FIG. 2;

FIG. 9a is an enlarged view of section 9a taken in FIG. 9;

FIG. 9b is an enlarged view of section 9b taken in FIG. 9;

FIG. 10 is a side elevational view of the multi-functional accessory shown in FIG. 9;

FIG. 21 is a front elevational view of a multi-functional accessory for supporting an existing electronic device, in accordance with a non-limiting exemplary embodiment, wherein arms of the novelty item are positioned at a horizontally-oriented retracted position about the brace;

FIG. 22 is a side elevational view of the multi-functional accessory shown in FIG. 21;

FIG. 30 is top plan view of the user interface embodied as a ring that can worn on the user's finger and slidably positioned on/off the support pole;

FIG. 31 is a side elevational view of the ring shown in FIG. 30;

FIG. 32 is a partial front elevational view of the support pole housing the ring thereabout.

Figure 1:
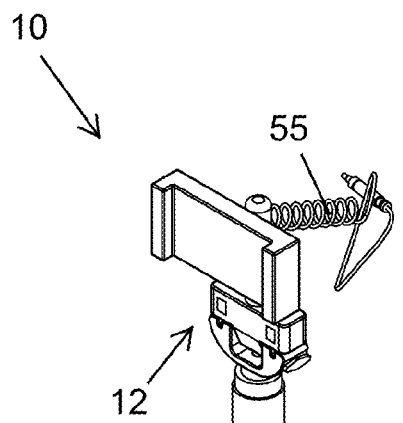
FIG. 1 is a perspective view of a multi-functional accessory for supporting an existing electronic device, in accordance with a non-limiting exemplary embodiment.
Figure 2:
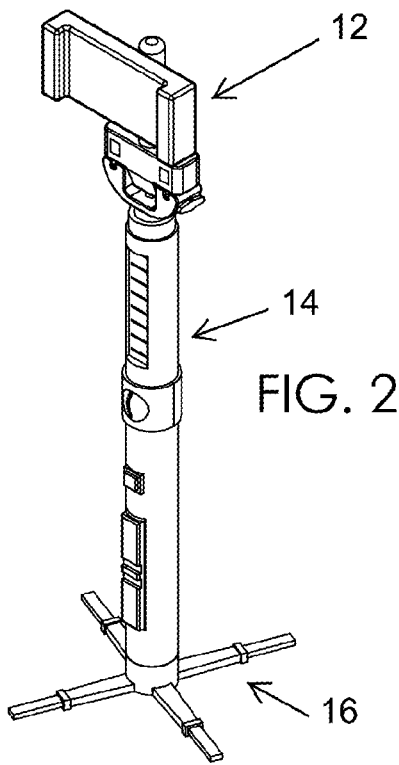
FIG. 2 is a perspective view of a multi-functional accessory for supporting an existing electronic device, in accordance with another non-limiting exemplary embodiment.
Figure 3:
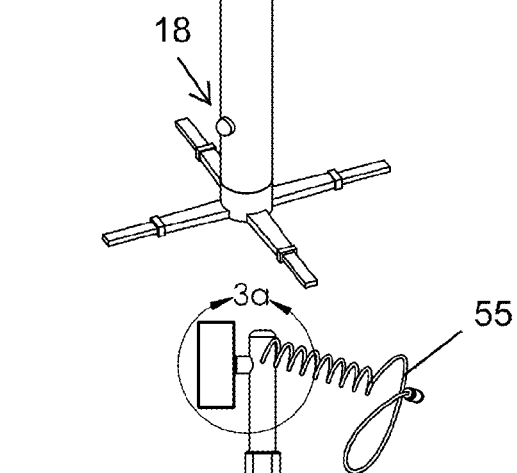
FIG. 3 is a side elevational view of a multi-functional accessory for supporting an existing electronic device, in accordance with another non-limiting exemplary embodiment.
Figure 3A:
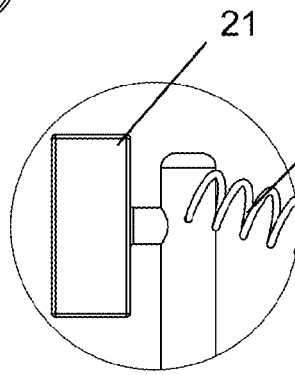
FIG. 3a is an enlarged view taken at section 3a in FIG. 3.
Figure 4:
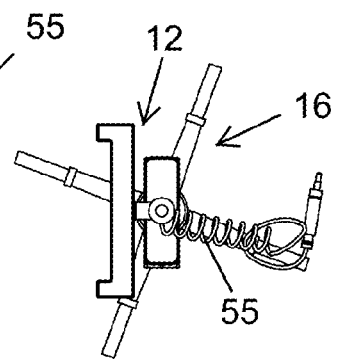
FIG. 4 is a top plan view of the multi-functional accessory shown in FIG. 1.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

The non-limiting exemplary embodiment(s) is/are referred to generally in FIGS. 1-33 and is/are intended to provide a multi-functional accessory 10 for supporting an existing portable electronic device (e.g., cell phone, tablet, etc.; not shown) when engaging in self-photography and self-videography. The multi-functional accessory 10 includes an adjustable holder 12 having an anterior side 13 configured to receive and maintain the existing portable electronic device at a substantially stable position, a telescopic support pole 14 detachably mated to the adjustable holder 12 wherein the telescopic support pole 14 has a centrally registered longitudinal y-axis 15, a base stand 16 detachably coupled to the telescopic support pole 14 and selectively oriented parallel to an x-axis 17 registered orthogonal to the y-axis 15. Advantageously, the adjustable holder 12 is selectively articulated about the x-axis 17 and the y-axis 15. Notably, a user interface 18 is configured to be in operable communication with the existing portable electronic device. Such a user interface 18 includes an actuation button 19 and/or 19a configured to execute at least one operational function selected from a group including taking a picture and recording a video at the existing portable electronic device.

In a non-limiting exemplary embodiment, the user interface 18 includes a ring 20 having the actuation button 19 disposed thereon. Such a ring 20 is slidably positioned about the telescopic support pole 14 and removable therefrom.

In a non-limiting exemplary embodiment, a communications device may be interfaced with the existing portable electronic device and the user interface 18. By way of example and not limitation, the communications device 50 may communicate with the existing portable electronic device using one or more wireless LAN (WLAN) protocols, using low power, ultra wide band (UWB) communication signals or some other type of wireless signals for RF or optical (e.g., infrared) communication of information to/from user interface. A real-time WLAN protocol or a standard wireless LAN protocol such as that of IEEE 802.11.times., BLUETOOTH® or IrDA may be used without departing from the scope of the present disclosure.

Optionally, various ports and interfaces may be provided to communicate with peripherals, subsystems and systems. Such devices may include serial ports for bi-directional communications, and/or optical communication (e.g., infrared) ports for wireless line of sight communications. Other ports may include parallel and USB ports.

In a non-limiting exemplary embodiment, the holder 12 includes a stretchable and resilient U-shaped brace 21 having a substantially rectangular shape at a non-stretched equilibrium position. Thus, brace 21 is capable of being stretched to frictionally fit a variety of electronic devices. A prop 22 is situated at a posterior side 23 of the U-shaped brace 21. Advantageously, the prop 22 has a first portion 24 registered parallel to the y-axis 15. Such a first portion 24 may be wide and planar for spanning across a major width of the brace 21 and bracket 27 for pivotal movement about the x-axis 17. A second portion 25 registered parallel to a z-axis 26 and statically mated to a proximal end of the first portion 24. In this manner, posterior side 23 of the U-shaped brace 21 is rotatably coupled to the second portion 25 and rotated about the z-axis 26. A bracket 27 has an upper section 28 statically coupled to a distal end of the second portion 25. Advantageously, the upper section 28 has a first light-emitting source 29 (e.g., camera/video flash or flashlight) facing towards an anterior direction relative to the posterior side 23 of the U-shaped brace 21. As noted below, a second light-emitting source 52 (e.g., video/camera flash or flashlight) may be positioned at alternate locations to not interfere with a vertical orientation of brace 21. The bracket 27 further has a lower section 30 adjustably connected to the upper section 28. Advantageously, the upper section 28 is selectively rotated about the x-axis 17 relative to the lower section 30, wherein the lower section 30 is statically coupled to a proximal tip 31 of the telescopic support pole 14. For example, a turn knob or dial 53 may be provided, which allows rotational displacement of the first light-emitting source 29 in anterior (forward) and posterior (rearward) directions about the x-axis 17 and relative to the pole 14.

Figures 15, 16:
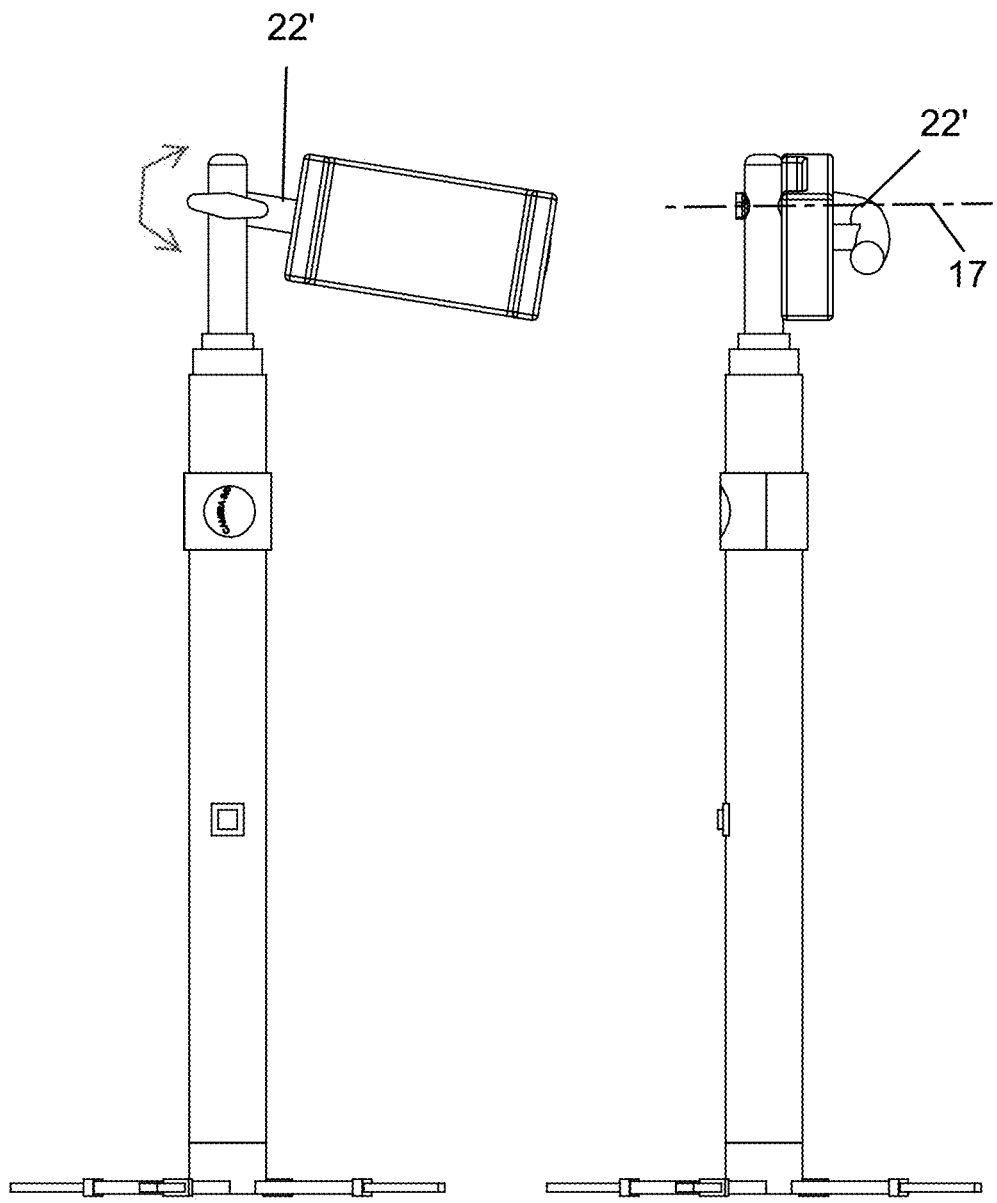
FIG. 15 is a perspective view of a multi-functional accessory for supporting an existing electronic device, in accordance with a non-limiting exemplary embodiment, wherein a curvilinear prop is employed.
FIG. 16 is a side elevational view of the multi-functional accessory shown in FIG. 15.
Figure 17:
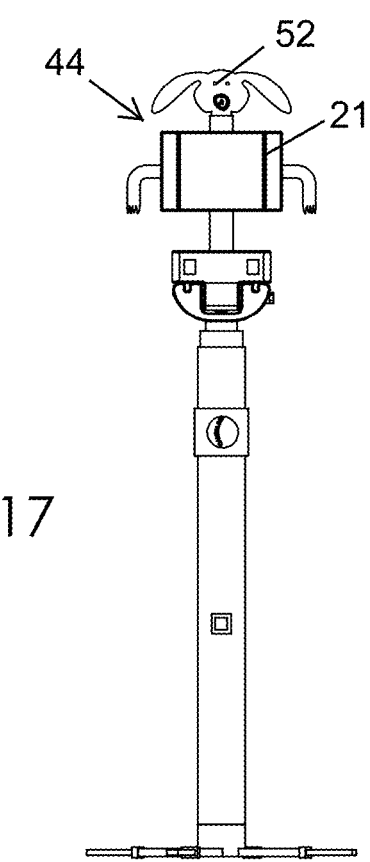
FIG. 17 is a front elevational view of a multi-functional accessory for supporting an existing electronic device, in accordance with a non-limiting exemplary embodiment, wherein a novelty item is employed with a telescopic support base.
Figure 18:
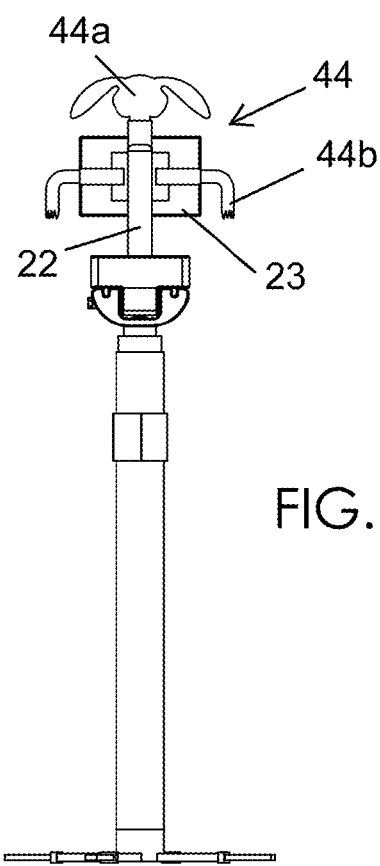
FIG. 18 is a rear elevational view of the multi-functional accessory shown in FIG. 17.
Figure 19:
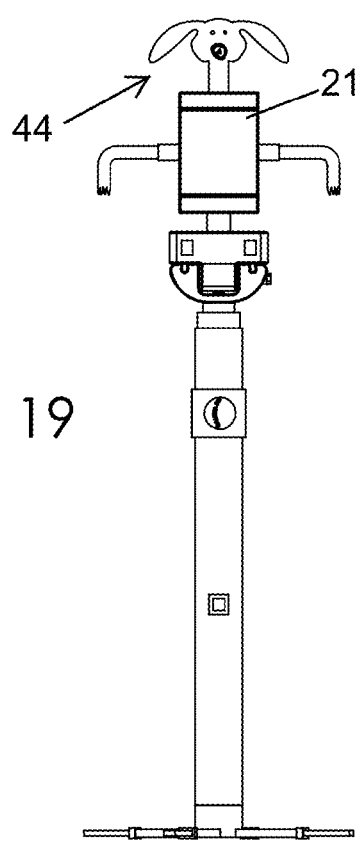
FIG. 19 is a front elevational view of a multi-functional accessory for supporting an existing electronic device, in accordance with a non-limiting exemplary embodiment, wherein arms of the novelty item are stretched out to an extended position.
Figure 20:
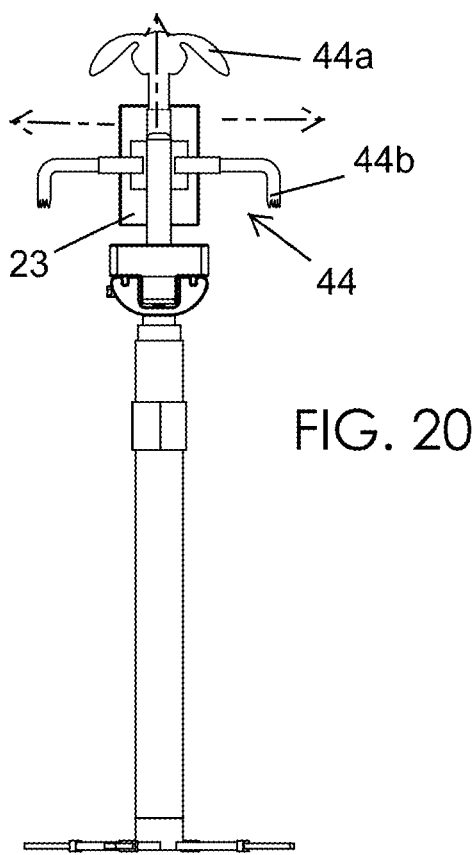
FIG. 20 is a rear elevational view of the multi-functional accessory shown in FIG. 19.
Figure 23:
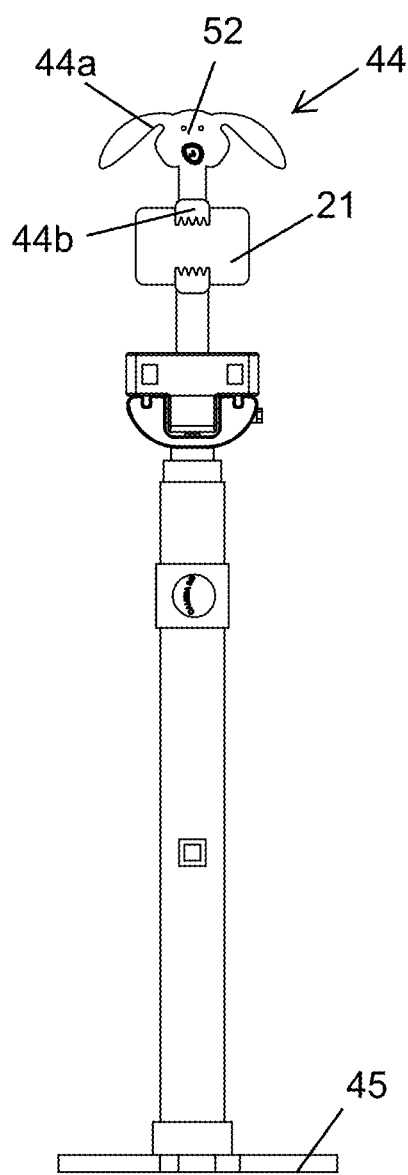
FIG. 23 is a front elevational view of a multi-functional accessory for supporting an existing electronic device, in accordance with a non-limiting exemplary embodiment, wherein arms of the novelty item are positioned at a vertically-oriented retracted position about the brace.
Figure 24:
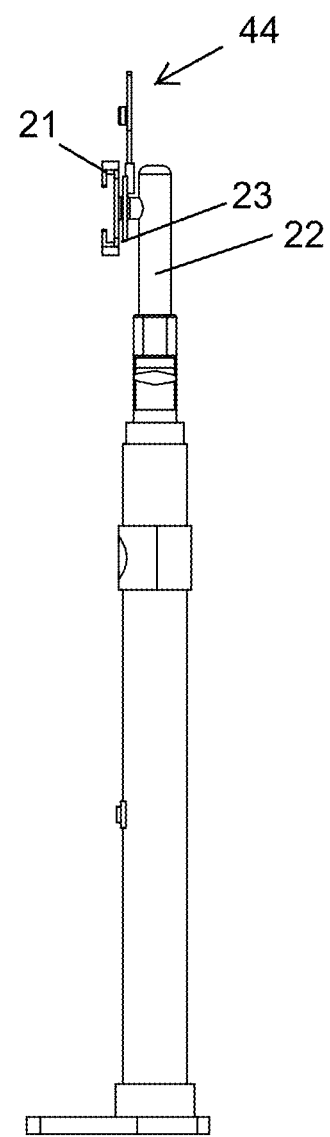
FIG. 24 is a side elevational view of the multi-functional accessory shown in FIG. 23.

As perhaps best shown in FIGS. 15-16, a non-limiting exemplary embodiment illustrates a prop 22' having a curvilinear shape for easy storage during non-operating conditions. Prop 22' can be rotated as shown in FIGS. 15-16.

Figure 5:
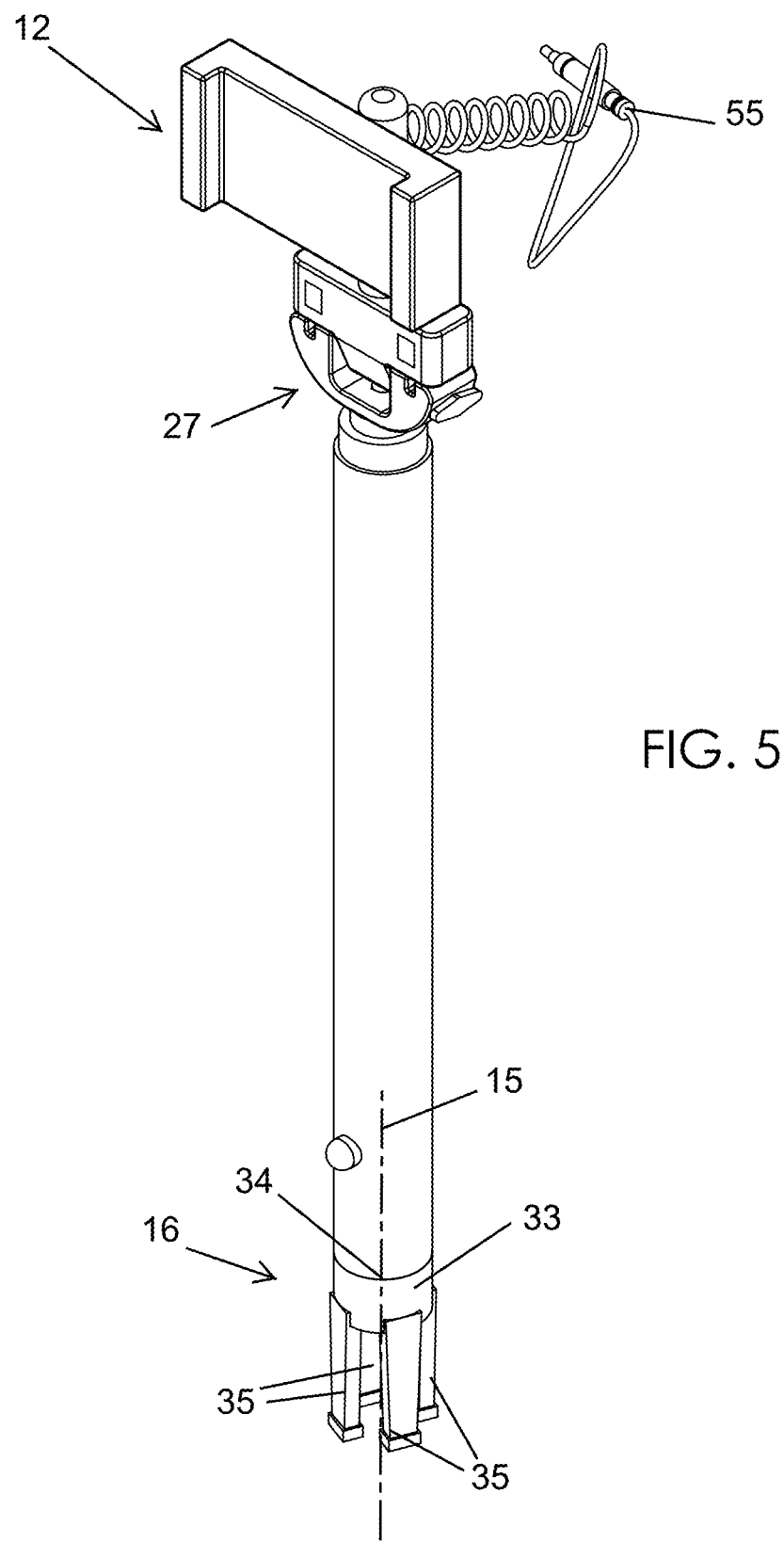
FIG. 5 is a perspective view of a multi-functional accessory wherein the base stand is adapted to a retracted position.
Figure 6:
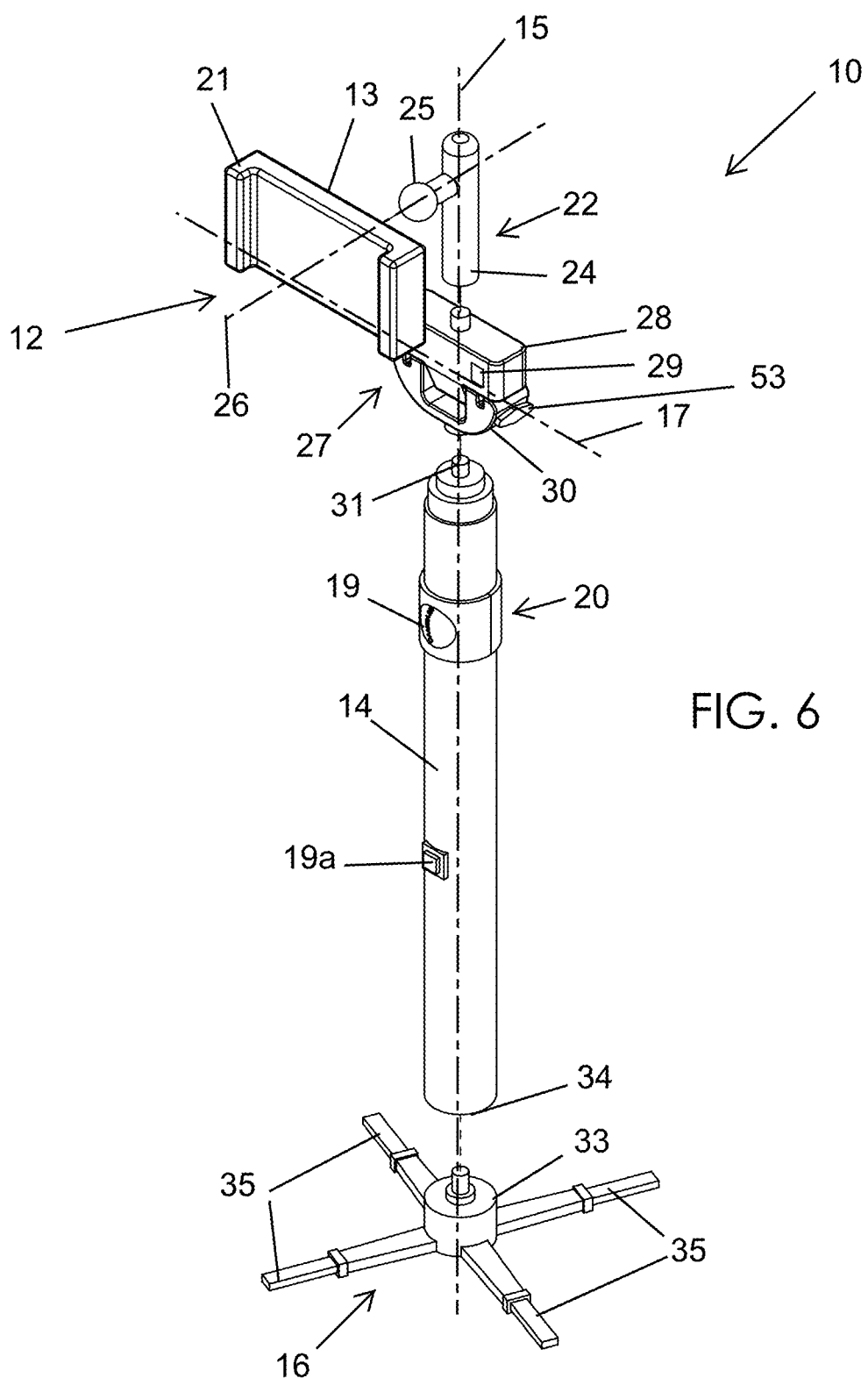
FIG. 6 is an exploded of a multi-functional accessory for supporting an existing electronic device, in accordance with a non-limiting exemplary embodiment.
Figure 11:
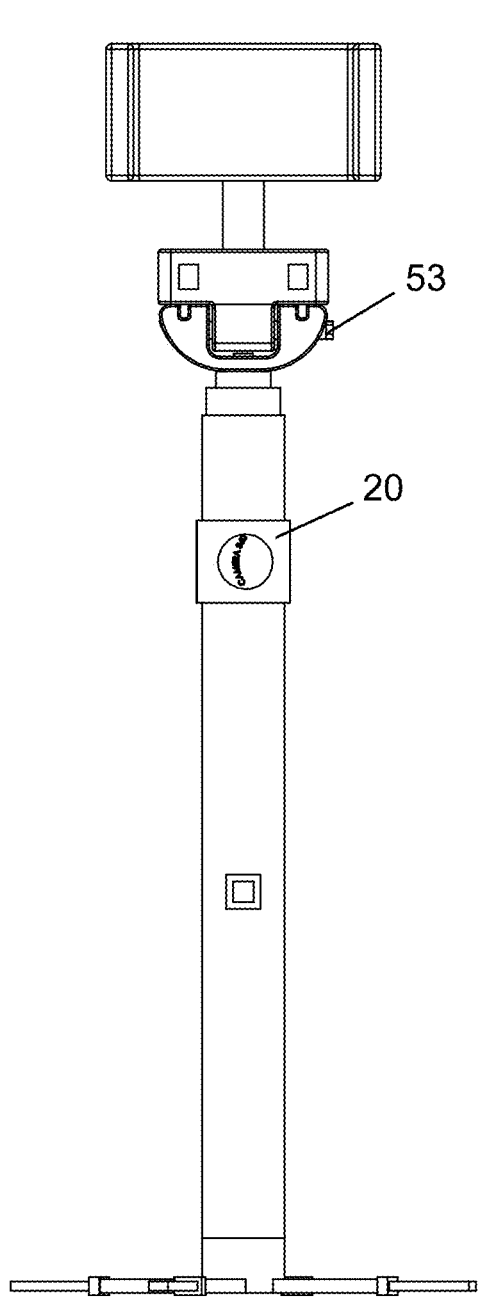
FIG. 11 is a front elevational view of the multi-functional accessory for supporting an existing electronic device, in accordance with a non-limiting exemplary embodiment, wherein a ball/socket fastener is added to a posterior side of the brace.
Figure 12:
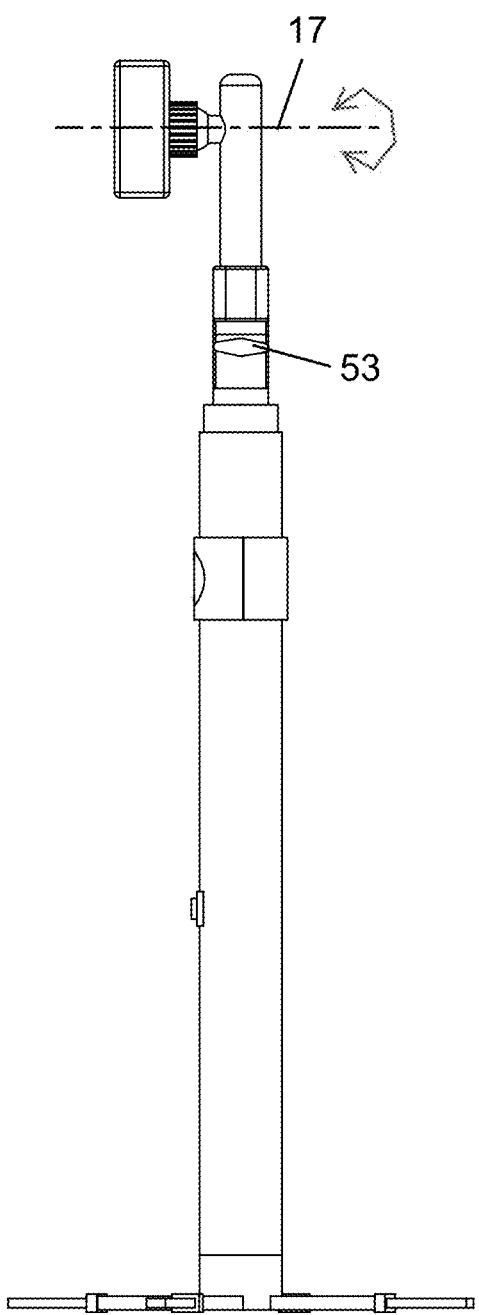
FIG. 12 is a side elevational view of a multi-functional accessory shown in FIG. 11.
Figure 13:
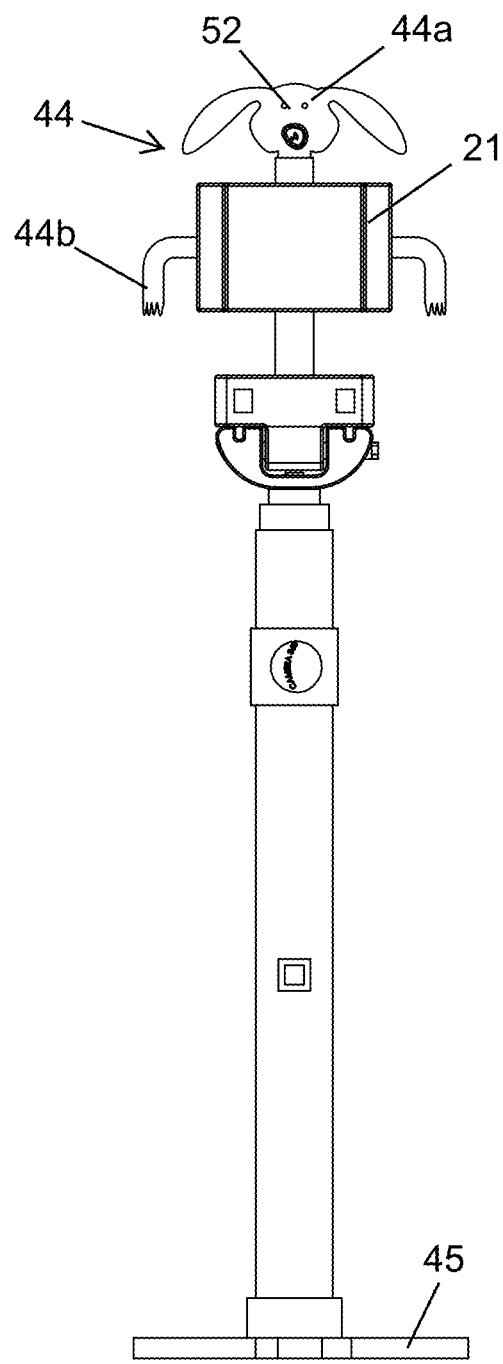
FIG. 13 is a perspective view of a multi-functional accessory for supporting an existing electronic device, in accordance with a non-limiting exemplary embodiment, wherein a novelty item is employed.
Figure 14:
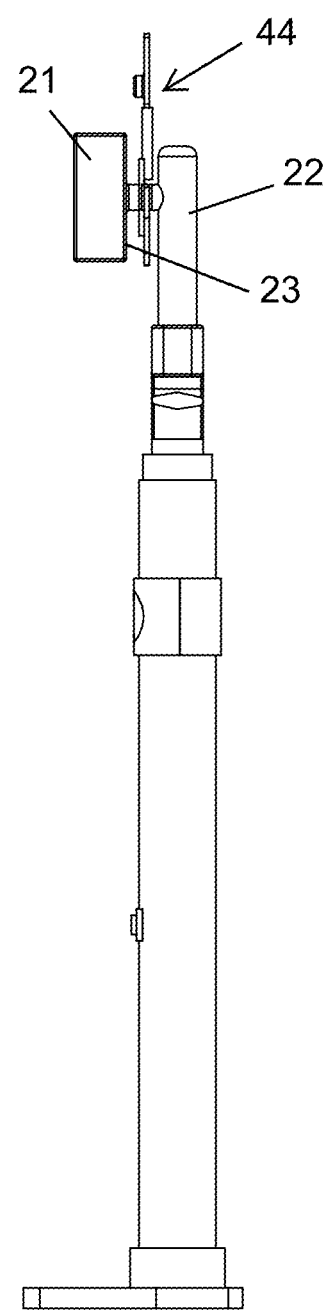
FIG. 14 is a side elevational view of the multi-functional accessory shown in FIG. 13.

In a non-limiting exemplary embodiment, as perhaps best shown in FIGS. 5-6, the base stand 16 includes a central hub 33 detachably mated to a distal tip 34 of the telescopic support pole 14, and a plurality of telescopic spokes 35 equidistantly spaced along a circumferential perimeter of the hub. Notably, the telescopic spokes 35 are pivotally coupled to the central hub 33 and selectively articulated between an extended horizontal position parallel to the x-axis 17 and a retracted vertical position parallel to the y-axis 15.

Figure 25:
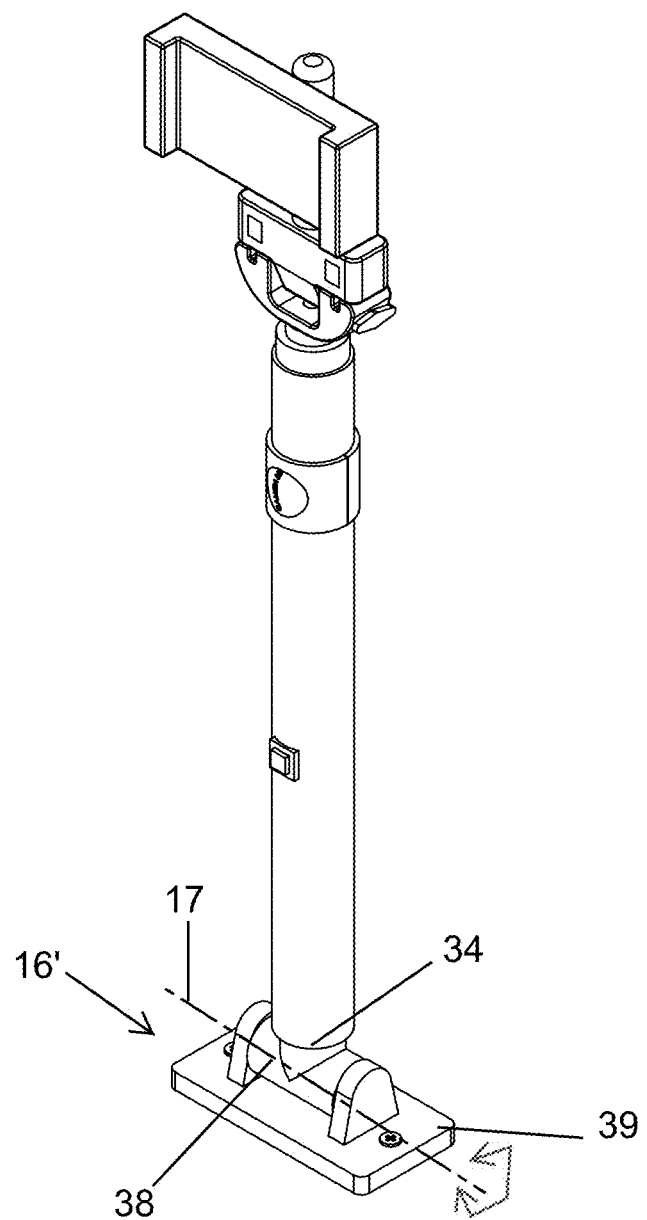
FIG. 25 is a perspective view of a multi-functional accessory for supporting an existing electronic device, in accordance with a non-limiting exemplary embodiment, wherein the support base is a swivel-type mechanism.

In a non-limiting exemplary embodiment, as perhaps best shown in FIG. 25, the base stand 16' includes a spindle section 38 mated to a distal tip 34 of the telescopic support pole 14, and a flat support plate 39 fixedly coupled to the spindle section 38. Notably, the spindle section 38 rotates in sync with the telescopic support pole 14 relative to a stationary position of the flat support plate 39.

Figure 26:
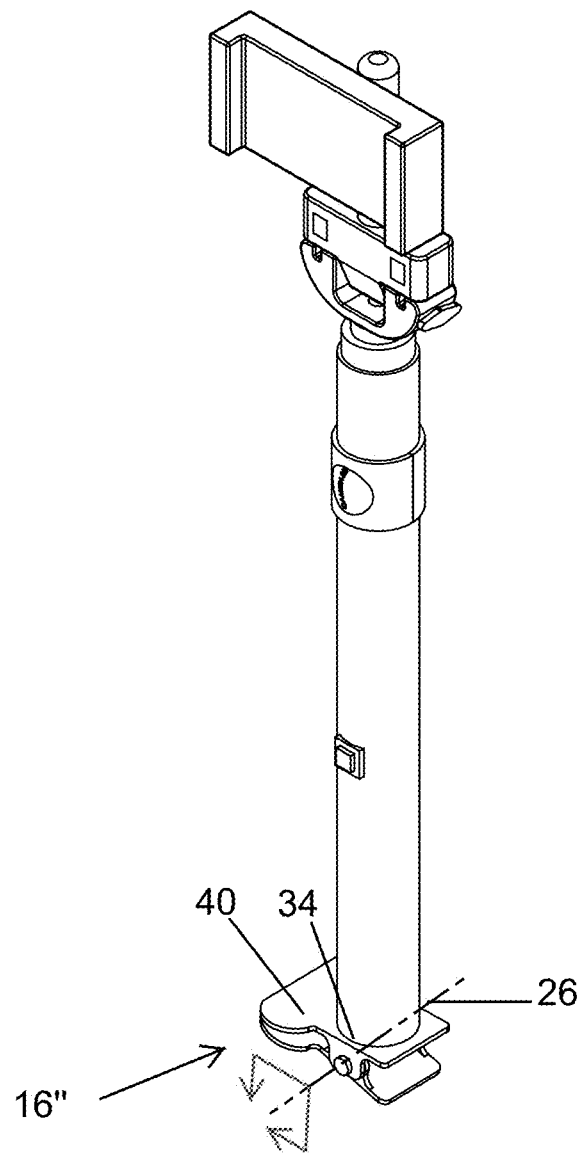
FIG. 26 is a perspective view of a multi-functional accessory for supporting an existing electronic device, in accordance with a non-limiting exemplary embodiment, wherein the support base is a clip mechanism.
Figure 27:
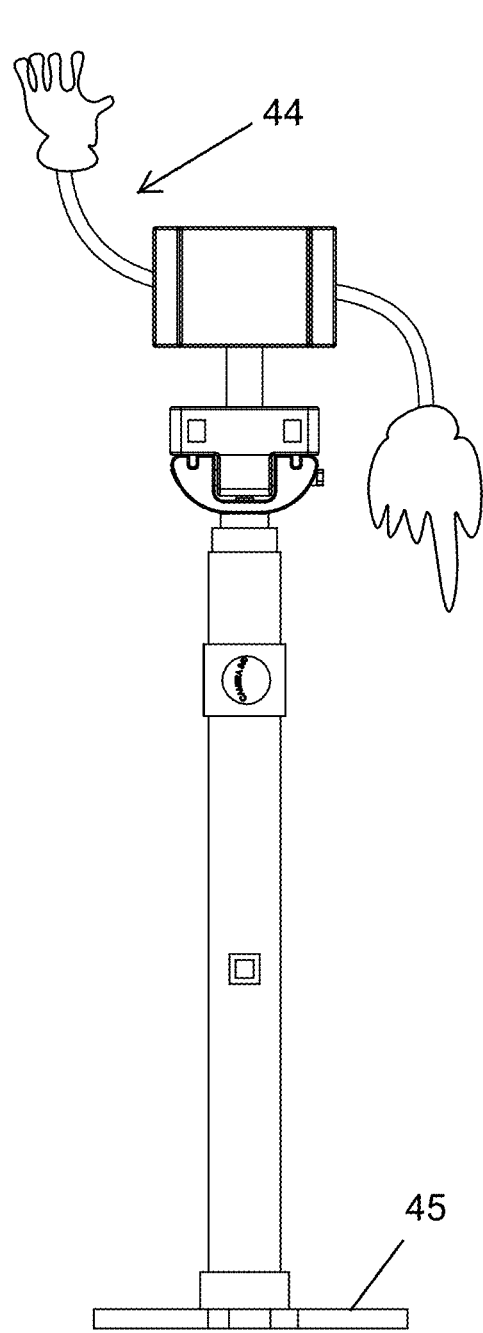
FIG. 27 is a front elevational view of a multi-functional accessory for supporting an existing electronic device, in accordance with a non-limiting exemplary embodiment, wherein the flexible hands of the novelty items are unique and oriented in opposite directions.
Figure 28:
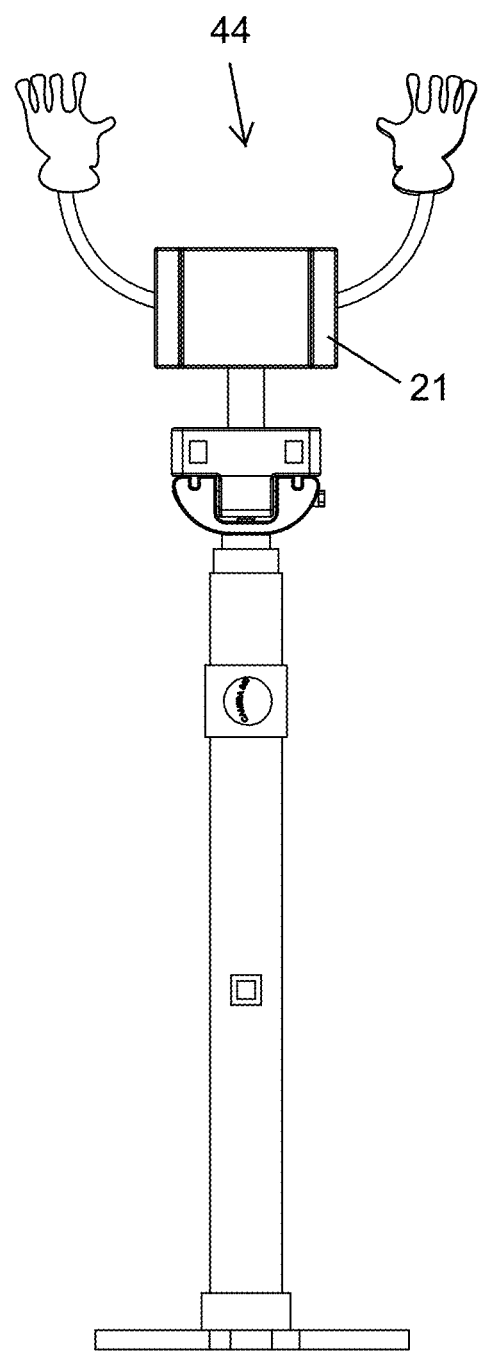
FIG. 28 is a front elevational view of a multi-functional accessory for supporting an existing electronic device, in accordance with a non-limiting exemplary embodiment, wherein the flexible hands of the novelty items are coextensively shaped and oriented in a same direction.
Figure 29:
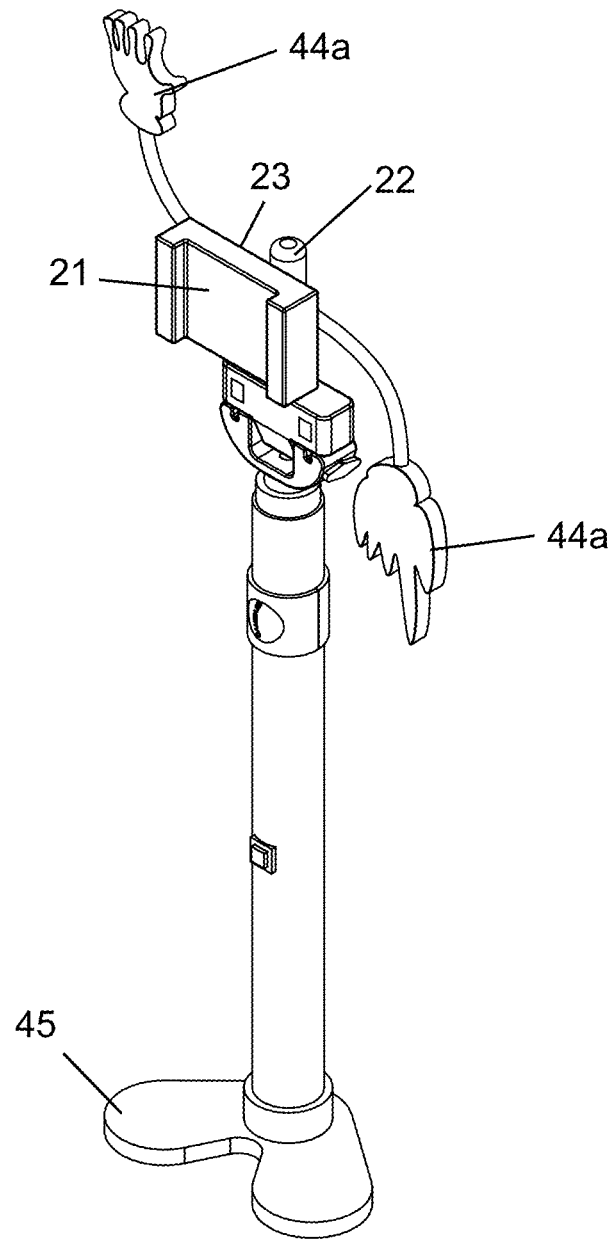
FIG. 29 is a perspective view of the multi-functional accessory shown in FIG. 27, wherein the support base is shaped as character feet.

In a non-limiting exemplary embodiment, as perhaps best shown in FIG. 26, the base stand 16" includes a spring-actuated clip 40 coupled to a distal tip 34 of the telescopic support plate 39.

Figure 33:
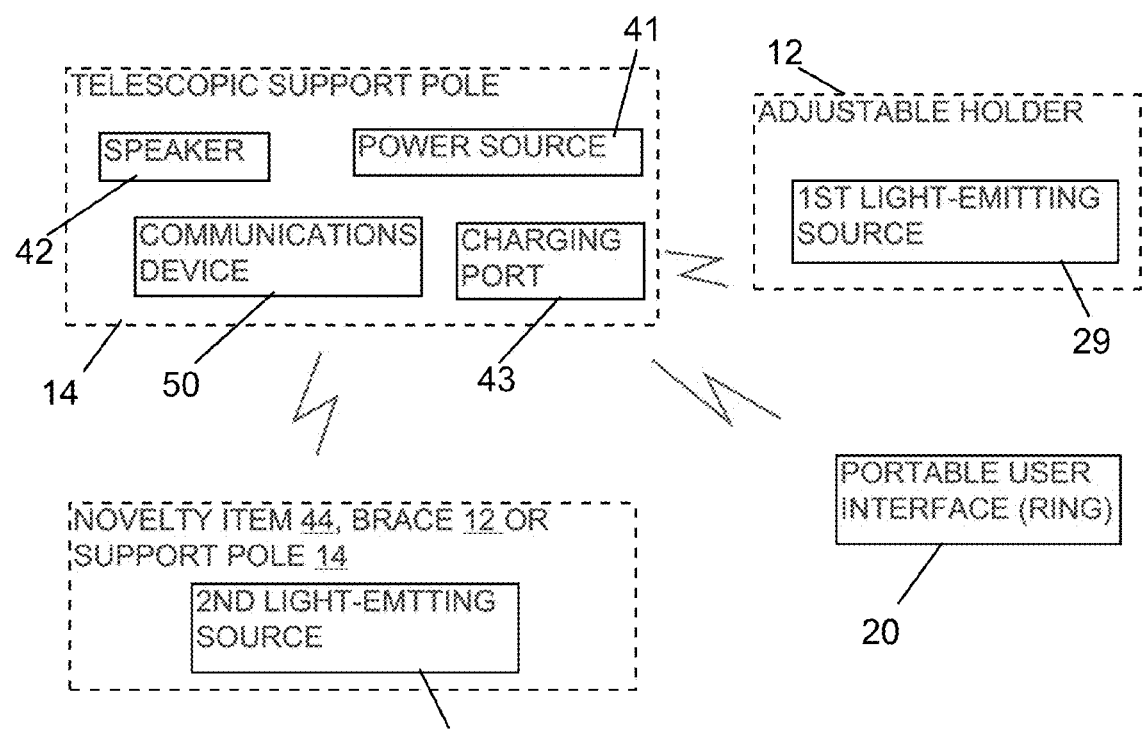
FIG. 33 is a high-level schematic block diagram illustrating the interrelationship between selected major electronic components of the multi-functional accessory for supporting an existing electronic device, in accordance with a non-limiting exemplary embodiment.

In a non-limiting exemplary embodiment, as perhaps best shown in FIGS. 9-10 and 33, a power source 41 is housed inside the telescopic support pole 14, a speaker 42 is disposed at the telescopic support pole 14 and is in communication with the power source 41 and the existing portable electronic device such that audio signals transmitted from the existing portable electronic device are emanated from the speaker 42. A USB charging port 43 is disposed at the telescopic support pole 14 and is in communication with the power source 41.

In a non-limiting exemplary embodiment, an audio jack 55 may be provided for plugging directly into an audio jack of the existing portable electronic device for playing back audio signals via the speakers 42. Alternately, a BLUETOOTH® connection may be employed to playback the audio signals via the speakers 42.

In a non-limiting exemplary embodiment, a novelty item 44 is connected to the prop 22 and situated at the posterior side 23 of the brace 21. Such a novelty item 44 includes at least one of a character face 44a and a plurality of adjustable hands 44b in close proximity to the brace 21. In addition, the base stand 16 may include character feet 45. Of course, a variety of novelty items having a variety of shapes/sizes and configurations, may be employed without departing from the true spirit and scope of the present disclosure.

In a non-limiting exemplary embodiment, a second light emitting source 52 is located at one of the character face 44a, the brace 21 and the telescopic support pole 14.

The present disclosure further includes a method of utilizing a multi-functional accessory 10 for supporting an existing portable electronic device when engaging in self-photography and self-videography. Such a method includes the steps of: providing an adjustable holder 12 having an anterior side 13 configured to receive and maintain the existing portable electronic device at a substantially stable position; providing and detachably matting a telescopic support pole 14 to the adjustable holder 12 wherein the telescopic support pole 14 has a centrally registered longitudinal y-axis 15; and providing and detachably coupling a base stand 16 to the telescopic support pole 14 wherein the base stand 16 is selectively oriented parallel to an x-axis 17 registered orthogonal to the y-axis 15.

Such a method further includes the steps of: providing a user interface 18 configured to be in operable communication with the existing portable electronic device wherein the user interface 18 includes an actuation button 19 configured to execute at least one operational function selected from a group including taking a picture and recording a video at the existing portable electronic device; and selectively articulating the adjustable holder 12 about the x-axis 17 and the y-axis 15.

A non-limiting exemplary embodiment(s) of the present disclosure is referred to generally in the figures and is intended to provide a multi-functional, telescoping support monopod (accessory 10), for use when engaging in self-photography/videography, featuring a fully rotatable smartphone/camera holder 12 and a variety of detachable base stands 16, including a tri-pod, square base, and clamp base, for free standing selfies, shooting or viewing video, and more. Functional intent is to provide an easier, more effective mechanism of capturing selfie pics and video from all angles, including vertical. Options may include Bluetooth®/Bluetooth remote control; speakers; flash assistance, lighting and charging capabilities; special character designs, etc. It should be understood that the exemplary embodiment(s) may be used to support a variety of electronic devices, and should not be limited to any particular electronic device described herein.

Referring to FIGS. 1-33 in general, in a non-limiting exemplary embodiment(s), the multi-functional accessory 10 is a "smarter" version of conventional monopods currently used to securely house a smartphone or digital camera, so that a wider shot is more easily achieved when engaging in self-photography. The multi-functional accessory 10 is fashioned from a durable yet lightweight aluminum alloy material, and may be configured to adjust, in a telescoping manner, from seven to forty-two inches (7"-42") in length, for example.

In a non-limiting exemplary embodiment, a secure wrist band as well as a comfortable, ergonomically sound rubberized handle may be employed. Several distinguishing characteristics set apart the multi-functional accessory 10 from conventional units. First, the support brace 21 for the phone or camera would offer a wider surface, better to accommodate the larger devices that are currently being produced. In this manner, users would not have to worry about their costly electronics slipping out. In addition, this brace 21 may be swivel-mounted to the end of the unit. This allow users to position the device 10 in a vertical mode, whereas conventional selfie-sticks only allow for horizontal positioning. Other improvements include, but are not limited to, constructing the telescoping pole so that it bends in a gooseneck fashion; adding a base stand 16 that turns the pole into a stationary tripod, or adding a clamp to secure the unit to a table or similar surface; and a "kickstand" implement for the device holder 12.

The multi-functional accessory 10 offers a number of benefits and advantages to consumers. For example, this unique accessory 10 fully optimizes the potential of the selfie photograph. Expanding the distance between the photographer and the digital camera device, the accessory 10 helps ensure that a larger expanse of background scenery as well as more individuals are able to be captured along with the photographer. As such, a tourist at the Grand Canyon would be able to take a more panoramic view of this wonder in her selfie, and a football player would have the ability to include more of his teammates for a celebratory shot after a game win.

Compact and lightweight, the multi-functional accessory 10 is easily carried in a backpack or similar conveyance, so that it is always at the ready to instantly take a selfie alone, with friends, or even a celebrity they should meet on the street. Most importantly, "smart" features such as the rotating holder 12, adjustable stick, and expandable base handily improve the limitations inherent in common units that are marketed as selfie sticks. Durably constructed, the multi-functional accessory 10 will withstand repeated use, with ease.

The multi-functional accessory 10 offer a more sensible and highly fun approach to taking personal portraits and selfie images via a digital camera or phone device. Intricate in design yet practical in function, this handy product could prove a favorite of any consumer, regardless of age or gender.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A multi-functional accessory for supporting an existing portable electronic device when engaging in self-photography and self-videography, said multi-functional accessory comprising:
   an adjustable holder having an anterior side configured to receive and maintain the existing portable electronic device at a substantially stable position;

a telescopic support pole mated to said adjustable holder, said telescopic support pole having a centrally registered longitudinal y-axis;

a base stand coupled to said telescopic support pole and selectively oriented parallel to an x-axis registered orthogonal to the y-axis;

wherein said adjustable holder is selectively articulated about the x-axis and the y-axis; and a user interface configured to be in operable communication with the existing portable electronic device, said user interface including an actuation button configured to execute at least one operational function selected from a group including taking a picture and recording a video at the existing portable electronic device.

2. The multi-functional accessory of claim 1, wherein said user interface comprises: a ring having said actuation button disposed thereon, said ring being slidably positioned about said telescopic support pole and removable therefrom.

3. The multi-functional accessory of claim 2, wherein said holder comprises:

a stretchable and resilient U-shaped brace having a substantially rectangular shape at a non-stretched equilibrium position;

a prop situated at a posterior side of said U-shaped brace, said prop having
 a first portion registered parallel to the y-axis, and
 a second portion registered parallel to a z-axis and statically mated to a proximal end of said first portion, said posterior side of said U-shaped brace being rotatably coupled to said second portion and rotated about the z-axis;

a bracket having
 an upper section statically coupled to a distal end of said second portion, said upper section having a first light-emitting source facing towards an anterior direction relative to said posterior side of said U-shaped brace, and
 a lower section adjustably connected to said upper section, said upper section being selectively rotated about the x-axis relative to said lower section, said lower section being statically coupled to a proximal tip of said telescopic support pole.

4. The multi-functional accessory of claim 3, wherein said base stand comprises:

a central hub detachably mated to a distal tip of said telescopic support pole; and a plurality of telescopic spokes equidistantly spaced along a circumferential perimeter of said hub;

wherein said telescopic spokes are pivotally coupled to said central hub and selectively articulated between an extended horizontal position parallel to the x-axis and a retracted vertical position parallel to the y-axis.

5. The multi-functional accessory of claim 3, wherein said base stand comprises:

a spindle section mated to a distal tip of said telescopic support pole; and a flat support plate fixedly coupled to said spindle section;

wherein said spindle section rotates in sync with said telescopic support pole relative to a stationary position of said flat support plate.

6. The multi-functional accessory of claim 3, wherein said base stand comprises:

a spring-actuated clip coupled to a distal tip of said telescopic support plate.

7. The multi-functional accessory of claim 3, further comprising:

a power source housed inside said telescopic support pole;

a speaker disposed at said telescopic support pole and in communication with said power source and the existing portable electronic device such that audio signals transmitted from the existing portable electronic device are emanated from said speaker; and a USB charging port disposed at said telescopic support pole and in communication with said power source.

8. The multi-functional accessory of claim 3, further comprising: a novelty item connected to said prop and situated at said posterior side of said brace, said novelty item including at least one of a character face and a plurality of adjustable hands in close proximity to said brace; wherein said base stand includes character feet.

9. The multi-functional accessory of claim 8, further comprising: a second light emitting source located at one of said character face, said brace and said telescopic support pole.

10. A multi-functional accessory for supporting an existing portable electronic device when engaging in self-photography and self-videography, said multi-functional accessory comprising:

an adjustable holder having an anterior side configured to receive and maintain the existing portable electronic device at a substantially stable position;

a telescopic support pole detachably mated to said adjustable holder, said telescopic support pole having a centrally registered longitudinal y-axis;

a base stand detachably coupled to said telescopic support pole and selectively oriented parallel to an x-axis registered orthogonal to the y-axis;

wherein said adjustable holder is selectively articulated about the x-axis and the y-axis; and a user interface configured to be in operable communication with the existing portable electronic device, said user interface including an actuation button configured to execute at least one operational function selected from a group including taking a picture and recording a video at the existing portable electronic device.

11. The multi-functional accessory of claim 10, wherein said user interface comprises: a ring having said actuation button disposed thereon, said ring being slidably positioned about said telescopic support pole and removable therefrom.

12. The multi-functional accessory of claim 11, wherein said holder comprises:

a stretchable and resilient U-shaped brace having a substantially rectangular shape at a non-stretched equilibrium position;

a prop situated at a posterior side of said U-shaped brace, said prop having
 a first portion registered parallel to the y-axis, and
 a second portion registered parallel to a z-axis and statically mated to a proximal end of said first portion, said posterior side of said U-shaped brace being rotatably coupled to said second portion and rotated about the z-axis;

a bracket having
 an upper section statically coupled to a distal end of said second portion, said upper section having a first light-emitting source facing towards an anterior direction relative to said posterior side of said U-shaped brace, and
 a lower section adjustably connected to said upper section, said upper section being selectively rotated about the x-axis relative to said lower section, said lower section being statically coupled to a proximal tip of said telescopic support pole.

13. The multi-functional accessory of claim 12, wherein said base stand comprises:
a central hub detachably mated to a distal tip of said telescopic support pole; and
a plurality of telescopic spokes equidistantly spaced along a circumferential perimeter of said hub;
wherein said telescopic spokes are pivotally coupled to said central hub and selectively articulated between an extended horizontal position parallel to the x-axis and a retracted vertical position parallel to the y-axis.

14. The multi-functional accessory of claim 12, wherein said base stand comprises:
a spindle section mated to a distal tip of said telescopic support pole; and
a flat support plate fixedly coupled to said spindle section;
wherein said spindle section rotates in sync with said telescopic support pole relative to a stationary position of said flat support plate.

15. The multi-functional accessory of claim 12, wherein said base stand comprises:
a spring-actuated clip coupled to a distal tip of said telescopic support plate.

16. The multi-functional accessory of claim 12, further comprising:
a power source housed inside said telescopic support pole;
a speaker disposed at said telescopic support pole and in communication with said power source and the existing portable electronic device such that audio signals transmitted from the existing portable electronic device are emanated from said speaker; and
a USB charging port disposed at said telescopic support pole and in communication with said power source.

17. The multi-functional accessory of claim 12, further comprising: a novelty item connected to said prop and situated at said posterior side of said brace, said novelty item including at least one of a character face and a plurality of adjustable hands in close proximity to said brace; wherein said base stand includes character feet.

18. The multi-functional accessory of claim 17, further comprising: a second light emitting source located at one of said character face, said brace and said telescopic support pole.

19. A method of utilizing a multi-functional accessory for supporting an existing portable electronic device when engaging in self-photography and self-videography, said method comprising the steps of:
providing an adjustable holder having an anterior side configured to receive and maintain the existing portable electronic device at a substantially stable position;
providing and detachably matting a telescopic support pole to said adjustable holder, said telescopic support pole having a centrally registered longitudinal y-axis;
providing and detachably coupling a base stand to said telescopic support pole, said base stand being selectively oriented parallel to an x-axis registered orthogonal to the y-axis;
providing a user interface configured to be in operable communication with the existing portable electronic device, said user interface including an actuation button configured to execute at least one operational function selected from a group including taking a picture and recording a video at the existing portable electronic device; and
selectively articulating said adjustable holder about the x-axis and the y-axis.

* * * * *